INVENTORS
BERNARD BREUKINK
JONAS FOSSEN
WIETZE MARTENS
BY
Frank R. Trifari
AGENT INVENTORS
BERNARD BREUKINK
JONAS FOSSEN
WIETZE MARTENS
BY Frank R. Trifari
AGENT 3,507,985

TELEVISION SYSTEM WITH AUXILIARY INFORMATION DURING THE VERTICAL RETRACE

Bernard Breukink, Josias Fossen, and Wietze Martens, Enschede, Netherlands, assignors, by mesne assignments, to U.S. Philips Corporation, New York, N.Y., a corporation of Delaware Filed Sept. 27, 1966, Ser. No. 586,597
Claims priority, application Netherlands, Sept. 9, 1965, 6512583
Int. Cl. H04n 7/16
U.S. Cl. 178—5.6 15 Claims

ABSTRACT OF THE DISCLOSURE

A television transmission system which transmits a normal signal and an auxiliary signal. Different portions of a picture comprising the auxiliary information are transmitted during the successive vertical retrace times of the normal signal. After a selected number of fields the picture will be completely transmitted. A main and an added counter supply the necessary vertical sweep for the auxiliary signal; the horizontal sweep is the same as for the normal signal. A separate display apparatus is used for the auxiliary signal.

The invention relates to a transmission system and to the associated apparatus for the transmission of television signals.

In certain cases, for example the police authorities, the customs and other services may have a need for being able to transmit photographs of persons, cards or other information by television. In many cases, however, this information should not be visible to the public as a whole. It may be desirable, for example, to transmit rapidly a photograph of a person to be held up to various police stations without the person concerned being aware of the fact that his photograph is available at said stations. This may be particularly important if the person concerned is likely to pass the frontiers, so that his personal description has to be transmitted rapidly to various frontier stations.

The fundamental idea of the invention is that it is too expensive to arrange a separate television mains for such cases, so that it is required to design a transmission system in which transmission via an existing system is possible without the general public being in any way aware thereof. If such a new system is available, various services are in a position to transmit rapidly information through the existing transmitter system without the normal television programme being disturbed.

For this purpose the transmission system according to the invention is characterized in that at the transmitter end there are provided means for adding an additional video signal to the normal video signal during $n$ line periods or parts of line periods of one field of a conventional television signal, whilst, if necessary, the original television signal is erased by a signal from separate camera apparatus, the horizontal scan of which is performed at the same rate as that of the normal television signal, the vertical scan being, however, changed so that the information of one image of the separate camera apparatus can be transmitted during $m$ fields of the normal television signal, whilst at the receiver end there are provided means for releasing display apparatus during at least the same $n$ line periods or parts of line periods of one field of the normal television signal, in which apparatus the horizontal scan is performed in the conventional manner and the vertical scan is carried out so that the information of one image picked up at the transmitter end by the separate camera apparatus can be displayed at the receiver end during $m$ fields of the normal television signal, there being provided a memory element capable of storing the displayed information.

It should be noted that for such purposes the system according to the invention is more appropriate for secrecy than a separate television system, since a person knowing about the separate system and being interested in it may purchase a receiver, so that he knows when the separate transmitter of this system is broadcasting and is therefore in a position to capture the information. If, on the contrary, the additional signal is transmitted unperceived with the normal television signal, no one will be aware thereof.

In order to improve the imperceptability and thus to provide the possibility for various services to utilize this system, the transmission system according to the invention is characterized in that at the transmitter end the injection of the additional video signal is performed during part of the vertical blanking time of the normal television signal.

A further feature of the transmission system according to the invention consists in that at the start of the separate camera apparatus a code signal is transmitted simultaneously and at the receiver end decoding means are provided to cause the receiver(s) to respond when the code signal concerned is received.

A few possible embodiments of the apparatus at the transmitter end and at the receiver end for use in a transmission system according to the invention will be described with reference to the accompanying figures.

Figure 1:
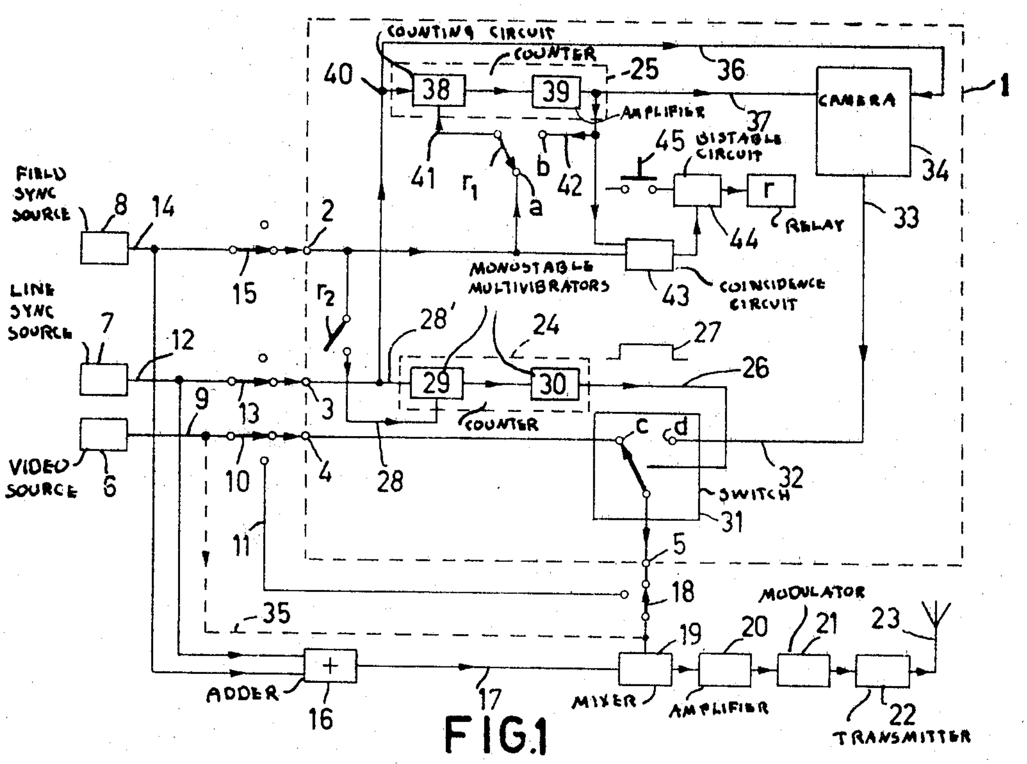
FIG. 1 shows the apparatus at the transmitter end.

In FIG. 1 the block 1 represents the apparatus required for adding a separate television signal in the studio to the normal television signal. The apparatus 1 comprises the input terminals 2, 3 and 4 and one output terminal 5.

In FIG. 1 the block 6 represents the source of the normal video signal in the studio. The block 7 represents the source of the normal line synchronizing signals. Finally the block 8 represents the source of the normal field synchronizing pulses.

The output terminal 9 of the source 6 is connected to the common contact of a switch 10, one output contact of which is connected to the input terminal 4 and the other output contact of which is connected to the conductor 11. The output terminal 12 of the source 7 is connected to the common contact of a switch 13, one output contact of which is connected to the input terminal 3 and the other output contact of which is not connected. The output terminal 14 of the source 8 is connected to the common contact of the switch 15, one output terminal of which is connected to the input terminal 2 and the other output contact of which is not connected. The terminals 12 and 14 are furthermore connected to an adding circuit 16, the output terminal 17 of which supplies the combined field and line synchronizing signal, whilst in the circuit 16 equalizing pulses can be added thereto, if the normal television system requires this addition. The conductor 11 leads to an output contact of a switch 18, the common contact of which is connected to a mixing stage 19 and the other output contact of which is connected to the output terminal 5 of the apparatus 1.

From FIG. 1 it will be apparent that, when the auxiliary apparatus 1 has to become operative, the switches 10, 13, 15 and 18 have to occupy the positions shown in FIG. 1. If not, the four switches have to be changed over so that the outputs leading to the input terminals 2, 3 and 4 are deprived of the signal and the video signal reaches directly via the conductor 11 the mixing stage 19.

After the mixing stage 19 there are arranged a video amplifier 20, a modulator 21 and a transmitting device 22, to the output of which is connected the aerial 23 for emitting the television signal. As will be explained hereinafter, the circuit 19, 20, 21, 22 and 23 is also employed for the transmission of the additional television signal to be broadcasting by the system according to the invention.

It will be obvious that the parts 21, 22 and 23 need not be at the same place as the above-mentioned parts, the link between the blocks 20 and 21 being established, for example, by a co-axial cable.

From the foregoing it will furthermore be obvious that at the transmitter end only the apparatus represented by the block 1 and the switches 10, 13, 15 and 18 are required in addition.

It will be apparent from the foregoing that the field synchronizing signal is available at the input terminal 2, the line synchronizing signal at the input terminal 3 and the video signal at the input terminal 4. The additional video signal to be transmitted is derived from the output terminal 5.

The apparatus 1 comprises a first counting circuit 24, which will be termed the auxiliary counter, and a second counting circuit 25, to be termed the main counter. The auxiliary counter 24 is arranged so that a square-wave pulse 27 is produced at its output terminal 26, the duration of which is equal to $n$ line periods. For this purpose line synchronizing pulses are supplied from the input terminal 3 to the first input terminal 28 of the auxiliary counter 24. At the same time field synchronizing pulses arrive from the input terminal 2 through the conductor 28, including the switch $r_2$, at a second input terminal of the counted 24. In the presence of both the line synchronizing pulse supplied via the conductor 28 and the field synchronizing pulse supplied via the conductor 28 the counting circuit 24 starts at the beginning of a field so that this counting circuit begins counting only at the beginning of each field period. The counting circuit 24 may comprise a first monostable multivibrator 29 and a second monostable multivibrator 30. The output of the multivibrator 29 is connected to the multivibrator 30 so that the rear flank of the square-wave pulse of a duration of $x$ line periods supplied by the multivibrator 29 puts the multivibrator 30 out of its stable state. The monosable multivibrator 30 returns from its unstable state into its stable state afer $n$ line periods. Therefore, a pulse 27 will appear at the output of the multivibrator 30 with a duration of $n$ line periods. Since the leading edge of the field pulse starts the multivibrator 29, the leading edge of said pulse 27 is at a distance of $x$ line periods from the leading edge of the field pulse. The trailing edge of the pulse 27 is therefore at a distance of $x+n$ line periods from the leading edge of the field pulse.

The square-wave pulse 27 obtained from the counting circuit 24 is used for driving the switch 31. The switch 31 is shown diagrammatically in FIG. 1 by a mechanical switch having two switching contacts $c$ and $d$ and a common contact leading to the output terminal 5. As long as the squarewave pulse 27 does not appear, the switch 31 is in the position shown in FIG. 1. This means that the video signal obtained from the input terminal 4 is directly supplied through the switch 31 to the output terminal 5, so that it reaches the mixing stage 19 through the switch 18, and the normal video signal is emitted in this position through the aerial 23. However, at the appearance of the pulse 27, the switch 31 is changed over for the time of its presence so that the switching contact $d$ is connected to the output terminal 5. The switching contact $d$ is connected through the conductor 32 to an output terminal 33 of a separate camera apparatus 34 in the system 1. When the switch 31 connects the switching contact $d$ to the output terminal 5 for the duration of the pulse 27, the video signal from the apparatus 34 replaces the normal video signal and can be emitted through the normal transmitter circuit 19, 20, 21, 22 and 23. As will be seen from FIG. 1, the synchronizing signal obtained from the conductor 17 remains unaffected, since in the embodiment of FIG. 1 the reproduction of the added video signal at the receiver end does not require additional synchronizing information. This will be evident from the following considerations. Since the pulses 27 appear during $n$ lines and, moreover, the leading edge of a pulse 27 is a distance of $x$ line periods from the beginning of a field, the video signal derived from the separate camera apparatus 34 will, of course, replace the normal video signal for $n$ line periods, which replacement invariably starts $x$ line periods after the beginning of a field. In the numerical example hereinafter $x=8$ and $n=5$, but these numbers are chosen arbitrarily and any other numbers may be used. However, the choice of these numbers has particular advantages if it is considered that for at least 19 line periods of the vertical blanking period no normal video signal is transmitted. From these 19 line periods three are subtracted, which are lying between the termination of the video signal of the preceding field and the leading edge of the field synchronizing pulse, which initiates the beginning of the next field. The field synchronizing pulse itself occupies about three line periods, so that at least 13 line periods, are left, during which no normal video signal is transmitted. The choice of $x=8$ and $n=5$ involves that the lines 8 to 12 of the 16 lines after the leading edge of a field synchronizing pulse are utilized for emitting the video signal from the apparatus 34 through the aerial 23. This means that a portion is used, where not any further video information is transmitted, neither a field synchronizing pulse, nor any equilisation pulse. Moreover, there is the advantage that during this vertical blanking period in normal television receivers the electron beam is suppressed so that the additional video information cannot be reproduced in any way by the conventional receivers.

In fact, by the choice of the aforesaid numbers the conductor 11 may be dispensed with, since during the lines 8 to 12, when the additional video information is applied to the mixing stage 19, the source 6 does not supply any video signal, so that the output terminal 9 of the source 6 may be directly connected to the input terminal of the mixing stage 19, which is connected to the switch 18, since the source 6 does not supply a signal for the period of time in which the switching contact $d$ is connected to the input terminal of the mixing stage 19. In this case the switching contacts of the switches 10 and 18, which are connected here to the conductor 11, may be loose contacts, whilst the connection between the source 6 and the mixing stage 19 is established directly, which is indicated by the broken line 35.

It will be obvious that the choice of $x=8$ and $n=5$ being arbitrary a higher number of $x$ may be chosen for shifting the occurrence of the $n$ line periods into part of the normal video signal, where the source 6 does not supply a video signal. In this case the switch 31 suppresses the normal video signal for $n$ line periods and switches on the additional video signal. In this case the conductor 11 is required, since otherwise a direct connection between the source 6 and the mixing stage 19 would provide two video signals to the mixing stage 19 for the said $n$ lines periods, which is undesirable.

As stated in the preamble the line synchronisation of the separate camera apparatus 34 is quite the same as that of the normal television signal. For this purpose the line synchronizing pulses are applied from the input terminal 3 through the conductor 36 to the camera apparatus 34, which comprises a conventional line deflection circuit, which is synchronized by means of the line synchronizing pulses supplied via the conductor 36.

The field synchronisation, however, must be carried out in a different way for a vertical scanning mode required by the system according to the invention. For this purpose new field synchronizing pulses are applied via the conductor 37 to the apparatus 34, which pulses are derived from the main counter 25.

The main counter 25 comprises a counting circuit 38 proper and an amplifier 39; the line synchronizing pulses from the input 3 are applied to a first input terminal 40, whereas to a second input 41 pulses are applied which reset the counting circuit 38 as to say to the zero position at their appearance. In other words, the pulses applied through the conductor 41 determine the instant of starting of the counting circuit 38, so that when a pulse is applied to the terminal 41 the counting circuit 38 starts counting the pulses received at the input 40. The counting circuit 38, which may be conventional digital counter, counts, for example, 312 line pulses and then delivers a pulse, which, subsequent to amplification in the amplifier 39, arrives through the conductor 37 at the field pulse generator of the camera apparatus 34 and synchronises the same. The new field synchronizing pulses supplied through the conductor 37 thus determine each beginning of the vertical scan by the apparatus 34.

From FIG. 1 it will be seen that the input terminal 41 is connected to the common contact of the switch $r_1$, one switching contact of which (a) is connected to the input terminal 2 and the other switching contact $b$ of which is connected through the conductor 42 to the output terminal of the amplifier 39. In the state in which the apparatus 34 should not be operative, the switch $r_1$ is in the position shown in FIG. 1, so that the field synchronizing pulses attain the input terminal 41 through the switch $r_1$. In such a state, therefore, the field synchronizing pulses determine the start of the counting circuit 38, which is thus started at each beginning of a field and counts 312 lines, after which the field pulse generator of the apparatus 34 is synchronised. It is thus ensured that the counting circuit 38 is invariably set into the correct counting position at the beginning of a field. When the switch $r_1$ is changed over in a manner to be described hereinafter, so that the switching contact $b$ is connected to the input terminal 41, the start of the counting circuit 38 is taken over by the output pulses, which attain the input terminal 41 through the conductor 42. The counting circuit 38 then counts 312 line pulses and is then reset to zero, after which a new count of 312 line pulses is started, which means that, when the switch $r_1$ is changed over, the field synchronisation in the apparatus 34 is no longer performed in the normal way; it is shifted each time by half a line period with respect to the preceding field synchronisation. The significance thereof will be explained hereinafter with reference to the Tables I and II.

However, first the significance of a coincidence stage 43, a bistable multivibrator 44, a push-button 45 and a relay $r$, arranged in the apparatus 1 will be explained: they serve for starting and switching off the apparatus 34 with its separate field synchronisation. The start is obtained by the pushbutton 45. When the latter is depressed, the bistable multivibrator 44 is caused to change over. Thus the relay $r$ is energized, so that the switches $r_1$ and $r_2$, associated with said relay, are switched over. The counter 24 is thus made operative. The counting circuit 38 can be actuated in the manner required for the new vertical scan by the apparatus 34.

Switching off is by the coincidence of an output pulse of the counting circuit 38 and a field synchronizing pulse applied from the input terminal 2 to the coincidence stage 43, which will be further explained with reference to Tables I and II. At the coincidence of these two pulses the coincidence stage 43 provides a pulse which causes the bistable multivibrator 44 to change over, so that the energization of the relay $r$ is interrupted and the switches $r_1$ and $r_2$ are reswitched to the position shown in FIG. 1.

For a better understanding of the whole system reference is made to the Tables I and II, which are based on the numbers $x=8$ and $n=5$ and on a choice of 312 line pulses, counted by the main counter 25.

TABLE I

<table>
<tr><th>Number of field</th><th>Real r.s. pulse</th><th>New r.s. pulse</th><th colspan="6">Pulses counted by main counter 25</th></tr>
<tr><td>0</td><td>0</td><td>0</td><td>1</td><td>2</td><td>3</td><td>4</td><td>5</td><td>312</td></tr>
<tr><td>1</td><td>312.5</td><td>312</td><td>313</td><td>314</td><td>315</td><td>316</td><td>317</td><td>624</td></tr>
<tr><td>2</td><td>625</td><td>624</td><td>625</td><td>626</td><td>627</td><td>628</td><td>269</td><td>936</td></tr>
<tr><td>3</td><td>937.5</td><td>936</td><td>937</td><td>938</td><td>939</td><td>940</td><td>941</td><td>1,248</td></tr>
<tr><td>4</td><td>1,250</td><td>1,248</td><td>1,249</td><td>1,250</td><td>1,251</td><td>1,252</td><td>1,253</td><td>1,560</td></tr>
<tr><td>|</td><td>|</td><td></td><td></td><td></td><td></td><td></td><td></td><td></td></tr>
<tr><td>|</td><td>|</td><td></td><td></td><td></td><td></td><td></td><td></td><td></td></tr>
<tr><td>|</td><td>|</td><td></td><td></td><td></td><td></td><td></td><td></td><td></td></tr>
<tr><td>|</td><td>|</td><td></td><td></td><td></td><td></td><td></td><td></td><td></td></tr>
<tr><td>625</td><td>195,312.5</td><td>195,000</td><td></td><td></td><td></td><td></td><td></td><td></td></tr>
</table>

TABLE II

<table>
<tr><th rowspan="2">Number of field</th><th rowspan="2">Real r.s. pulse</th><th colspan="5">Pulses counted by aux. counter 24</th><th rowspan="2">Lines of new field</th></tr>
<tr><th>29 — — — —</th><th>30 — — — —</th><th></th><th></th><th></th></tr>
<tr><td>0</td><td>0</td><td>1— — — 8</td><td>9</td><td>10</td><td>11</td><td>12</td><td></td></tr>
<tr><td>1</td><td>312.5</td><td>313— — — 320</td><td>321</td><td>322</td><td>323</td><td>324</td><td>1 to 5 incl.</td></tr>
<tr><td>2</td><td>625</td><td>626— — — 633</td><td>634</td><td>635</td><td>636</td><td>637</td><td>2 to 6 incl.</td></tr>
<tr><td>3</td><td>937.5</td><td>938— — — 945</td><td>946</td><td>947</td><td>948</td><td>949</td><td>2 to 6 incl.</td></tr>
<tr><td>4</td><td>1,250</td><td>1,251— — —1,258</td><td>1,259</td><td>1,260</td><td>1,261</td><td>1,262</td><td>3 to 7 incl.</td></tr>
<tr><td>|</td><td>|</td><td>|</td><td>|</td><td></td><td></td><td></td><td>|</td></tr>
<tr><td>|</td><td>|</td><td>|</td><td>|</td><td></td><td></td><td></td><td>|</td></tr>
<tr><td>|</td><td>|</td><td>|</td><td>|</td><td></td><td></td><td></td><td>|</td></tr>
<tr><td>|</td><td>|</td><td>|</td><td>|</td><td></td><td></td><td></td><td>|</td></tr>
<tr><td>625</td><td>195,312.5</td><td>195,313</td><td></td><td></td><td></td><td></td><td></td></tr>
</table>

The left-hand column of Table I indicates the numbers of the field relating to the normal fields of a television signal furnished by the sources 6, 7 and 8. The next column indicates the real field synchronizing pulses related to the numbers of the line pulses associated with the field concerned. Since in the European system one field comprises 312.5 line periods, the first field pulse appears after 312.5 line periods, the second field synchronizing pulse after 625 line periods, the third after 937.5 line periods and the fourth after 1250 line periods and so forth. Since the field synchronizing pulses invariably reset the counting circuit to zero, when the switch $r_1$ is in the rest position shown in FIG. 1, the counting circuit 25 will continue counting normally, when the switch $r_1$ is changed over by the depression of the push-button 45, the difference being, however, that the pulse given off at the 312th line pulse resets the counter to zero. In this way said counter will supply a pulse each time at the 624th, 936th, 1248th, etc. line pulse. These pulses are indicated in the third column of Table I; they represent so to say the new field synchronizing pulses, which are applied through the conductor 37 to the apparatus 34. Therefore, as stated above, the vertical scan of the apparatus 34 is shifted from field to field by half a line period.

The last column of Table I indicates the numbers of the pulses counted by the main counter 25. From these numbers follows directly the appearance of the new field synchronizing pulse as indicated in the third column.

Table II indicates the numbers relating to the auxiliary counter 24. The left-hand column of Table II indicates the numbers of the fields of the normal television signal, which therefore correspond with those of the left-hand column of Table I. The second column of Table II indicates also the real field synchronizing pulses in the same manner as in Table I, that is to say in relation to the number of the line pulse associated with the field synchronizing pulse concerned. Since each field synchronizing pulse supplied through the conductor 28 causes the multivibrator 29 to change over at the appearance of a line synchronizing pulse, the multivibrator 29 so to say counts each time the line pulses 1 to 8, after the multivibrator 30 counts each time the lines 8 to 12. This is indicated in the third column of Table II. The multivibrator 29 will thus count the lines 1 to 8, 313 to 320, 626 to 633 etc., but the multivibrator 30 will count the lines 8 to 12, 320 to 324, 633 to 637 etc.

It being supposed that the push-button 45 is depressed at the $0^{th}$ field, the switches $r_1$ and $r_2$ will be changed over somewhere in this field. This means that the main counter 25 supplies at the 312th pulse the first synchronizing pulse for the picture to be scanned by the camera apparatus, said picture arriving as video information at the switching contact $d$. The first lines, when the switching contact $d$ is connected to the output terminal 5, are the lines 320 to 324 and since the first scan by the apparatus 34 associated with this first normal field starts at the line 313 (cf. the line associated with the field 1 of Table I), the release of the viedo signal by the switch 31 (cf. the line associated with the field 1 in Table II) is not shifted in place with respect to the scan. Therefore, the lines 1 to 5 of the new field are traced, which is apparent from the last column of Table II. From the scan of the second field governed by the field pulses supplied through the conductor 37 it will be seen that this second scan starts at the line 625 and continues to the line 936 (see the line associated with the field 2 in Table I). A comparison thereof with the release of the video signal by the switch 31 will show that the counter 24 starts counting from the 626th line, which is one line later than the start of the field synchronisation (cf. the line associated with the field 2 of Table II and that of the field 2 of Table I). The field deflection has thus started one line earlier, so that the scanned lines are so to say shifted with respect to the released lines, which occurs during the lines 633 to 637. It can thus be said that the lines associated with the field 2 are associated with the lines 2 to 6 of the new field, scanned by the apparatus 34. Applying, the same to field 3, it will be apparent that the start of the field synchronisation lies at the line 937, whilst the release determined by the counter 24 occurs at the line 938. Also in this case the release is one line later than the scan, so that also during the third field the lines 2 to 6 of the new field are traced. In the fourth field the synchronisation starts at the line 1249. The counter 24 starts at the line 1251 so that during the lines 1258 to 1262 video information is supplied from the apparatus 34 to the mixing stage 19. The release thus occurs two lines later (1251 to 1249=2) than the scan so that the lines 3 to 7 of the new field are scanned. In this way a shift of one line occurs after every two fields, which is determined by the choice of the number 312 for the counter 25. During each field the scan thereof in the apparatus 34 is shifted by half a line period and hence one line period of two fields, which is apparent from the numbers of the scanned lines of the new field in the last column of Table II. As a result, during every 8th to 12th line of each field video information is applied to the mixing stage 19, which corresponds to five scanned lines in the apparatus 34. These batches of five lines shift from top to bottom, since in each field the scanning time of the new field is half a line period earlier than the field of the normal television picture. Therefore, during 625 fields of the normal television image 625 batches of five lines of the new television picture can be transmitted. The number of 625 is found by dividing 312.5, that is the number of line periods of one field by ½, that is the difference between the pulses counted by the counter 25 and the real number of pulses of one field of the normal television picture. If the counter 25 counts only 310 lines, then 312.5—310—2.5 line periods is the difference between the counted pulses and real line pulses of one field and the number of fields $m$ required for achieving a complete vertical scan by the apparatus 34 is $$312.5/2.5=125$$

fields. In general it can be said that when the number of lines of one field is $$\frac{2k+1}{2}$$

the number of line pulses to be counted by the counter 25 is $$\frac{2k+1}{2}\pm\frac{2p+1}{2}$$

Herein $k$ and $p$ are integers and it must apply, moreover, that $$\frac{2p+1}{2}$$

can be divided on $$\frac{2k+1}{2}$$

since the number of fields $m$ required for accomplishing a complete scan by the apparatus 34 is given by $$m=\frac{\frac{2k+1}{2}}{\frac{2p+1}{2}}$$

As stated above, $$\frac{2k+1}{2}$$

of the European system is 312.5 and if the counter 25 counts 312 line pulses, the minus sign applies and $p=0$, and if 310 line pulses are counted $p=2$ and also the minus sign applies. As a matter of fact $p$ may be any other number, provided the condition of divisibility is fulfilled. This mode applies to television systems having a different number of line pulses per field, provided the aforesaid condition of divisibility is fulfilled. There must furthermore be such a relation between the number of $n$ lines released during each normal field and the choice of $p$ that during each field each line is traced an equal number of times. This will be seen from the last column of Table II; after two fields a shift by one line has taken place. With any other value of $p$, tables similar to the Tables I and II, given by way of example, will show whether the last-mentioned condition is fulfilled.

It should still be explained that after 625 fields the apparatus 1 is automatically switched off. This is achieved by the fact that the coincidence stage 43 receives both the normal field synchronizing pulses and the new field synchronizing pulses from the counter 25. From the third column of Table I it appears that after 625 fields the new field synchronizing pulse appears at the 195,000th line pulse after the start. The field synchronizing pulse as indicated in column 2 of Table I appears after the 195,312.5th line pulse. The difference between the real and the new field synchronizing pulse is exactly 312.5 line periods, which is exactly the number of lines of one field. Therefore, after 625 fields after the start of the real and the new field synchronizing pulses coincide in the coincidence stage 43. By differentiation of the pulse of smaller width of these two pulses—in the embodiment shown in FIG. 1 the pulse from the counter 25—it is ensured that at the accurate coincidence of these pulses the coincidence stage 43 supplies a pulse which causes the bistable multivibrator 44 to change over so that the relay $r$ is de-energized and the switches $r_1$ and $r_2$ are switched back. Thus the scan of one image is finished.

Figure 2:
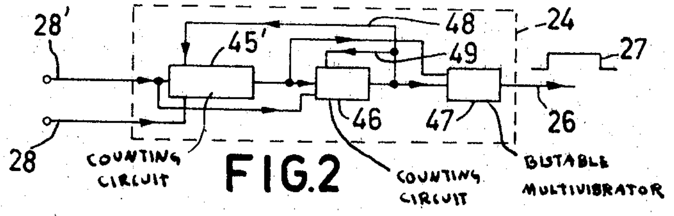
FIG. 2 shows a counting circuit for use in the apparatus shown in FIG. 1.

In the foregoing the counter 24 is described with reference to two monostable multivibrators 29 and 30. This provides the possibility to release the apparatus 34 for a number of line periods and/or parts of line periods, but this operation is not very accurate, since the count of the $x$ and $n$ line pulses depends upon the RC-times of the multivibrators 29 and 30, which determine the duration of the a-stable state of such a multivibrator. FIG. 2 shows an embodiment of an auxiliary counter 24 which can count the desired pulses more accurately. The counter shown in FIG. 2 comprises a first counting circuit 45', which can count $x$ line pulses and a second counting circuit 46, which can count $n$ line pulses. The line synchronizing pulses are applied from the input terminal 28' both to the counter 45' and to the counter 46. The output of the counter 45' is connected to the input of the counting circuit 46 and to the input of a bistable multivibrator 47. Moreover, the output of the counting circuit 46 is connected to the input of the multivibrator 47 through the conductor 48 to an input of the counter 45' and via the conductor 49 to its own input. The counter 24 operates as follows. The field synchronizing pulses supplied through the terminal 28 start the counting circuit 45', which then counts $x$ line pulses. After the $x^{th}$ line pulse the counting circuit 45' supplies a pulse which starts the counting circuit 46 and causes the multivibrator 47 to charge over. The counting circuit 46, which has started at the $x^{th}$ pulse, then counts $n$ line pulses and supplies, at the $x+n^{th}$ line pulse, after the leading edge of a field pulse, one pulse, which causes on the one hand the multivibrator 47 to change back and on the other hand the counter 45' to cease counting via the conductor 48 and via the conductor 49 the counter 46 to cease as well. Since $x>n$, the counter 45' is stopped before the second sequence of $x$ pulses can re-start the counter 46. In this way it is ensured that the duration of the pulse 27 from the conductor 26 is exactly equal to $n$ line periods, whilst its leading edge lies at the $x^{th}$ pulse after the appearance of the leading edge of the field pulse.

Figure 3:
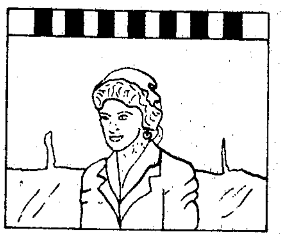
FIG. 3 shows a picture suitable for being transmitted by the system according to the invention, the upper side of said picture showing a possible code pattern.

FIG. 3 shows a picture which may be picked up by the camera apparatus 34. It will be seen that a beam pattern is designed at the top of said picture. This pattern forms a code which is transmitted together with the new video signal to be added. It will be described hereinafter for the receiver that this beam pattern has a given frequency, when scanned. By providing a filter in the receiver tuned to said given frequency, the choice of said beam pattern determines for which receiver the picture concerned is intended. By using a different beam pattern a different frequency can be transmitted and by adapting the filter in the receiver concerned, it can be ensured that only this receiver responds. In this way a given degree of secrecy is obtained, since the receiver concerned only responds when the relevent code signal is coming in; a certain degree of automation can thus be obtained, since the receiver becomes operative only when the relevant signal is emitted from the transmitter. The receiver can thus operate quite independently.

It will be obvious that the code signal may be joined completely by electric agency by supplying to the switching contact $d$ during the start of a scan of the new field a signal of the frequency intended for the receiver to be attained. It is, however, much simpler to provide a beam pattern at the top of a picture, since thus pre-fabricated strips may be used to be put on a picture before it is slipped into the camera apparatus.

It should be noted that the scanning method by means of the counter 25 is not strictly required. The camera apparatus 34 may be provided with a separate vertical deflection voltage generator which supplies a sawtooth voltage of vary low repetition frequency. In the embodiment shown, in which the counter 25 counts 312 line pulses, 625 normal fields are required for accomplishing a complete scan in the apparatus 34. 625 fields correspond, at a normal field frequency of 50 c./s. to 12.5 seconds. Therefore, if the separate generator is caused to supply a sawtooth of a period of 12.5 sec., the scan is just performed in the correct period of time. In this case the field synchronizing pulses must directly synchronize this separate generator after the depression of the starting switch. This may be achieved by supplying the field synchronizing pulses through said starting switch to the separate generator.

If the counter 25 counts 310 line pulses, only 125 fields are required for a complete scan by the apparatus 34. 125 fields correspond to 2.5 sec. of complete scanning time so that the separate generator has to supply a sawtooth of a duration of 2.5 seconds. It will be obvious that instead of using a sawtooth generator, a step voltage generator may be employed, which supplies a signal which produces the scan in the apparatus 34 only during the period of time, when the switch 31 connects the contact $d$ to the output terminal 5. Particularly the sawtooth of a period of 12.5 sec. offers satisfactory possibilities, since with a choice of $n=5$ and with the adaptation of the height of the spot of the electron beam it can be ensured that during the scan by the apparatus for $n$ lines the spot scans practically the same line of the picture to be scanned. The vertical displacement during said time is extremely small in view of the long periods of the sawtooth. In a 625-line system the duration of 5 lines is $$5\times 64.10^{-6}=32.10^{-5}\text{ sec.}$$

The duration of one field of the normal television signal is $20.10^{-3}$ sec. If it is ensured that in this period of $20.10^{-3}$ sec. the spot is displaced by the deflecting sawtooth in a vertical sense over a distance exactly equal to its own height, the displacement during said $32.10^{-5}$ sec. is, of course, very small. Since $625.20.10^{-3}$ sec.$=12.5$ sec., the spot has shifted just once across the overall height of the screen of the camera during 625 fields of the normal video signal.

It should finally be noted that instead of a monochrome camera apparatus 34 use may be made of a colour camera apparatus 34. In this case the apparatus 34 comprises three cameras, which scan the picture concerned in red, green and blue respectively. With respect to the code signal to be transmitted this has the further advantage that the beam pattern described with reference to FIG. 3 may have a given colour, which is taken into account at the receiver end, so that at this end a synchronous demodulator may be joined to the decoding system, which responds only to one colour. Apart from the frequency of the pattern a choice may be made betwen one of the three colours, so that the code is extended in a simple manner.

Figure 4:
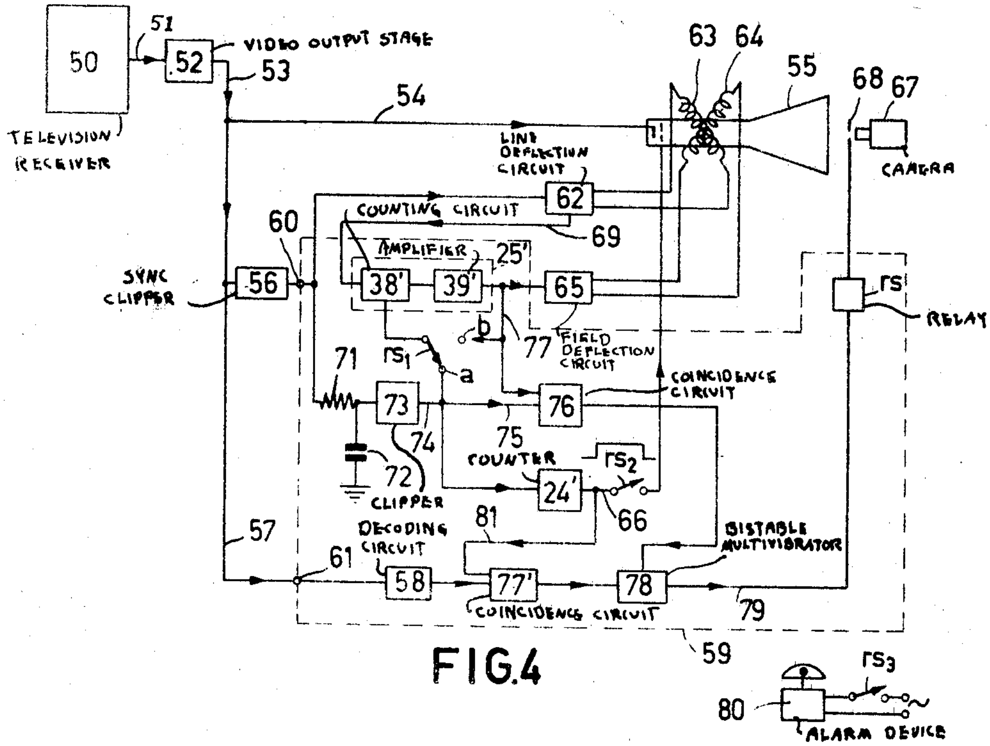
FIG. 4 shows the apparatus at the receiver end.

A receiver intended for reproducing the video signal picked up by the separate camera apparatus 34 is illustrated in FIG. 4. In FIG. 4 reference numeral 50 designates a conventional receiver, the detected television signal being available at its output terminal 51. This television signal is applid to a video output stage 52, the output terminal 53 of which is connected through the conductor 54 to the cathode of a display 55 for the television image.

The conductor 53 is connected furthermore to a synchronisation clipper 56, which separates the synchronizing signals from the overall television signal. Finally the video signal is applied through the conductor 57 to the decoding circuit 58, which serves to ensure that the receiver only starts when the relevant signal is transmitted. However, for a good understanding first the further parts of the block 59 will be explained. The block 59 comprises the parts to be included in a conventional receiver in order to render it suitable for the reception of a television signal transmitted by the method according to the invention. It will be obvious that instead of an existing receiver use may be made of a separate receiver which comprises not only the parts of the block 59 but also the parts required for processing the video signal from the conductor 53, said parts are shown in FIG. 4 beyond the block 59.

The arrangement 59 comprises a first input terminal 60, to which is applied the overall separated synchronizing signal, and an input terminal 61, to which said video signal is applied via the conductor 57. The line synchronizing pulses, which, in general, need not be processed further, are applied from the terminal 60, to the line deflection circuit 62, which passes a sawtooth current of line frequency through the horizontal deflection coils 63. FIG. 4 shows furthermore the vertical deflection coils 64, which are fed from the field deflection circuit 65. The field pulse generator 65 is synchronized by means of new field synchronizing pulses obtained from the counter 25′, which is identical to the counter 25 in the transmitter. The counter 24′ operates substantially like the counter 24 in the transmitter and therefore supplies at its output 66 a positive-going pulse 67, which attains the grid of the display tube via the switch $rs_2$ when it is closed. Therefore, only during the appearance of the pulse 67 the electron beam is operative in the display tube 55.

Since at the receiver end the beam scan is performed in quite the same manner as at the transmitter end and the release of the electron beam by means of the pulse 67 substantially corresponds to the change-over of the switch 31 in the transmitter, it will be obvious that when the camera apparatus 34 picks up batches of 5 lines, the reproducing apparatus displays each of said batches of 5 lines. Therefore, when the receiver is switched on 55 batches of 5 lines pass from top to bottom to display the new television image.

As stated above, the scan of this new image takes 12.5 seconds, when 312 line pulses are counted by the counters 25 and 25′, and this is much too slow for observation by the human eye. In front of the screen of the tube 55 there is arranged a photographic camera 67, the shutter 68 of which is opened at the start of the scan of the new television image and is closed at the termination of a scan of $m$ fields. Thus the displayed television image is recorded by the camera 67, operating as a memory element. It will be obvious that any other memory element may be used successfully for the purpose. The display tube 55 may be constructed as a storage tube, which stores the charge applied by the electron beam, which charge may then be employed in a different manner for the display. In principle, phosphor having a very long post, luminescent time may be used for this purpose, so that the image so as to say stays on the screen of the tube 55.

Apart from said components the arrangement 59 comprises a conductor 69, through which the line pulse obtained from the line ocillator of the deflection circuit 62 are applied to the counter 25′. It is thus ensured that the counter 25′ obtains only the pulses intended for it. There is furthermore provided an integrating network formed by a resistor 71 and a capacitor 72, by means of which the field synchronizing pulses are separated from the overall synchronizing signal. The clipper 73 provides at its output 74 clean, square-wave field synchronizing pulses, which attain the counter 38′ via the switch $rs_1$, in the rest position thereof as shown in FIG. 4, and which attain furthermore through the conductor 75 the coincidence stage 76, which has a function similar to that of the coincidence stage 43 of FIG. 1. The output terminal 77 of the conductor 25′ is connected not only to the switching contact $d$ of the switch $rs_1$ but also to an input terminal of the coincidence stage 76.

The arrangement 59 finally comprises a further coincidence stage 77′ and a bistable multivibrator 78. The output of the multivibrator 78 is connected through the conductor 79 to the relay $rs$, which can actuate the switches $rs_1$, $rs_2$ and $rs_3$. The switches $rs_1$ and $rs_2$ have functions similar to those of the switches $r_1$ and $r_2$ in the transmitter and the switch $rs_3$ is adapted to actuate an alarm device 80 as soon as the relay $rs$ is energized. This energization is performed as follows. When at the transmitter end the switch 45 is depressed, so that the code signal is transmitted at the beginning of a transmission this code signal appears at the input of the circuit 58. The filter included in the circuit 58 passes only the frequency intended for the relevant receiver, which frequency is determined by the nature of the beam pattern at the top, shown in FIG. 3. If the frequency is passed, a signal appears at the output of the circuit 58. Moreover, the counting circuit 24′ provides the pulse 67, which also attains the coincidence stage 77′ through the conductor 81. Therefore, the output of the coincidence stage 77′ will provide, at the beginning of a field, a pulse at the appearance of a signal from the decoding circuit 58. At the beginning of a field the bistable multivibrator 78 is caused to change over, so that the relay $rs$ is energized with the result that the switches $rs_1$ and $rs_2$ change over, so that the display apparatus is rendered operative in the manner described, whilst the relay $rs$ at the same time opens the shutter 68 and commutates the switch $rs_3$, the alarm device 80 giving the information of a photograph being taken. After $m$ fields the new field synchronizing pulse appearing at the output terminal 77 will coincide with the normal field synchronizing pulse applied through the conductor 75 to the coincidence stage 76, since the counting circuit 25′ operates like the counting circuit 25. The output signal supplied by the stage 76 is applied to the bistable multivibrator 78, which is thus changed over, so that the relay $rs$ is de-energized and the switches $rs_1$, $rs_2$ and $rs_3$ are switched over and the shutter 68 is closed. Therefore, after $m$ fields the whole operation of the receiving circuit ceases.

It will be obvious that also at the receiver end the vertical scan may be performed by means of the generator 65, if the latter supplies a scanning signal of a period of, for example, 2.5 or 12.5 seconds. In the latter case the counting circuit 25′ may be dispensed with. However, the field synchronizing signals have to be applied through a switch actuated by the relay $rs$ to the generator 65. The normal field synchronizing pulses will start the generator 65 at the beginning of a given field upon which the apparatus 34 of the transmitter is put into operation.

If it is desired, the counting circuit 25 of the transmitter may still be used to provide the vertical synchronisation but at the receiver end a separate deflection generator may be used, in order to minimize the costs of the receiver, so that the counting circuit 25' may be omitted. Like for the transmitter it may be proved for the receiver that a sawtooth of a period of 12.5 sec. is to be preferred.

The counting circuit 24' of the receiver may be much simpler than the counter 24 of the transmitter. If the operation is performed, as stated above, during the vertical blanking period, it is sufficient to release the electron during this vertical blanking period of the normal television signal in the display tube 55. The counting circuit 24' may therefore be formed by a monostable multivibrator, which is moved out of its stable state by the leading edge of a field synchronizing pulse, the RC-time of said multivibrator being such that it remains in this a-stable state for at least $x+n$ line pulses and then returns to its stable state. The pulse 67 then has a duration which is longer than $x+n$ line pulses, whereas, in fact, the electron beam has to be released for $n$ line pulses, but since no video information is transmitted during the vertical blanking period there is no harm in it. If, on the contrary, the code signal were introduced somewhere in the middle of the normal television picture, which would be the case of $x$ is considerably higher than 8, the pulse 67 had to comprise exactly $n$ line periods and the counting circuit 24' had to be replaced by a counting circuit of the kind shown in FIG. 2.

In the foregoing the interlacing is completely out of consideration. This is of minor importance, since interlacing is normally used for reducing the flicker for the human eye. Since a memory element is used in this case, said flicker effect is not so important, so that interlacing is not required.

Figure 5:
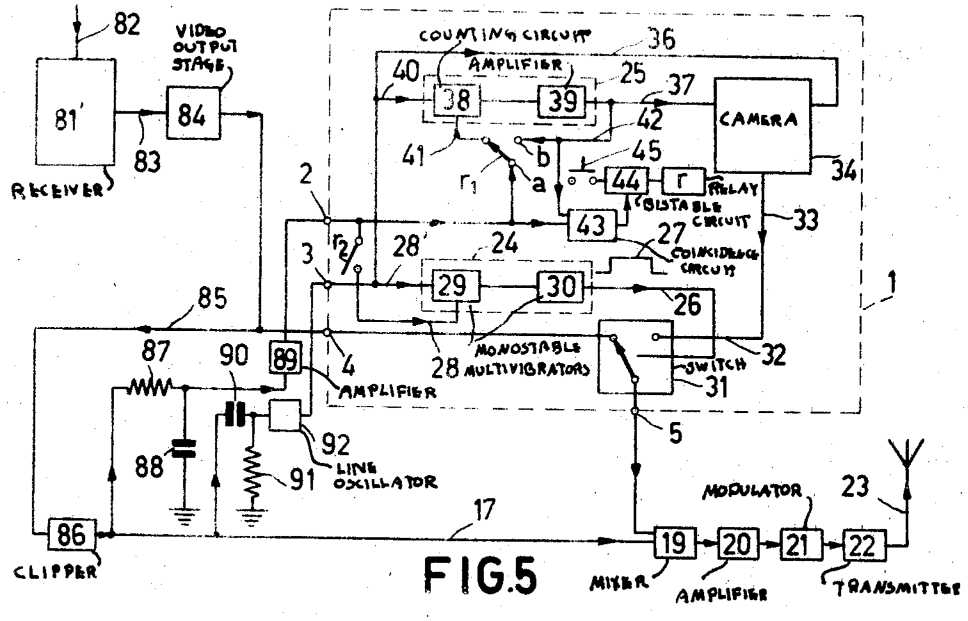
FIG. 5 shows the apparatus required for adding the signal of the separate camera apparatus of an auxiliary transmitter to the normal television signal.

The use of the transmission system according to the invention may be effective in an auxiliary transmitter. This provides the possibility to use the apparatus shown in FIG. 5 in the main transmitter if the normal television signal is transmitted from a television car through a link on the main transmitter; similar parts are designated as far as possible like those of FIG. 1. The difference between the arrangements of FIG. 5 and FIG. 1 consists in that the required signals have to be derived from the incoming television signal. For this purpose the arrangement of FIG. 5 comprises a receiver 81', to which the television signal obtained from the auxiliary transmitter is supplied through the link 82. This television signal is amplified and detected in the receiver 81' and applied as a video signal through the conductor 83 to a video output stage 84. The video signal obtained at the output of the stage 84, is applied to the input 4 and through the conductor 85 to a synchronizing-signal clipper 86, which separates the overall synchronizing signal from the video signal. This synchronizing signal is integrated in the integrating network formed by a resistor 87 and a capacitor 88 and subsequently converted in the amplifier 89 into a square-wave synchronizing signal, suitable for application to the input terminal 2. The same synchronizing signal is differentiated in the differentiating network formed by a capacitor 90 and a resistor 91 and applied to a line oscillator 92 to be synchronized, from which line pulses are derived for application to the input terminal 3. Finally the overall synchronizing signal is applied through the conductor 17 to the mixing stage 19 like in the arrangement shown in FIG. 1 from the adding circuit 16 through the conductor 17. It will otherwise be obvious that the arrangement of FIG. 5 is analogous to that of FIG. 1; it operates in quite the same manner.

It should finally be noted that the switch 31 is shown as a mechanical switch, but in fact it is an electronic switch. It may comprise two switching elements, for example, transistors or discharge tubes. The two output electrodes of the two switching elements are interconnected and connected to the output terminal 5. The input electrode of the first of the two switching elements is formed by the switching contact $c$ and the input electrode of the second switching element is formed by the switching contact $d$. The signal 27 can be converted in phase in the phase inverting stage included in the switch 31 and, in principle, two signals can be derived from said stage. The first signal is applied to the first switching element and the second signal to the second switching elements. The signal applied to the first switching element must have such a polarity that the first switching element is cut off during the appearance of the pulse 27 including $n$ line periods, whereas the signal applied to the second switching element renders this element conducting during the pulse 27. It is thus ensured that the video signal is alternately transmitted from the terminal $c$ and $d$ to the output terminal 5.

What is claimed is:

1. A transmission system for the transmission of a normal television signal having selected blanking times and an added television signal comprising a transmitter and a receiver, the transmitter including means for adding an additional video signal to the normal television signal during and without changing said selected vertical blanking time for a time period equal to $n$ line periods or parts of line periods of one field of the normal television signal, wherein the time period of said $n$ line periods is less than the vertical blanking period of the normal video signal, means for erasing portions of the original vertical blanking video signal including a signal from a separate camera apparatus, means for generating a horizontal scan for said added signal with the same rate as in the normal television signal and for generating a vertical scan of the added video signal at a rate different than the vertical scan of said normal television signal so that the information of one image of the separate camera apparatus can be transmitted in $m$ fields of the normal television signal, $n$ being greater than 1, the receiver including a separate added signal display apparatus, means for activating the display apparatus during at least the same $n$ line periods or parts of line periods of one field of the normal television signal, means for generating the horizontal scan in the normal manner, means for generating the vertical scan so that the information of one image, taken at the transmitter end by the separate camera apparatus, can be reproduced at the receiver end in $m$ fields of the normal television signal, and a memory element for storing the reproduced information.

2. A transmission system as claimed in claim 1 wherein the transmitter further comprises means for selecting said receiver from among a plurality of receivers for reception of said added video signal including means for transmitting a code signal identifying said receiver at the start of the separate camera apparatus at the same time and in that the receiver further comprises decoding means which cause the receiver to respond when the code signal is coming in.

3. An apparatus as claimed in claim 1 wherein the means for the adding of the additional video signal includes a first counting circuit means for receiving the normal line synchronizing pulses and for being actuated each time by the normal field synchronizing pulses, and for supplying after the actuation and after $x$ number of line pulses a substantially square-wave pulse of a duration of $n$ number of line periods or parts of line periods, and means responsive to said square-wave pulse to activate the separate camera apparatus.

4. An apparatus as claimed in claim 3, further comprising a field pulse generator and a second counting circuit having a first and second input said first input receiving the normal line synchronizing signal, said second counter being reset each time to the zero position by means of pulses applied to said second input said second counter counting from zero position, supplies a pulse when $$\frac{2k+1}{2}\pm\frac{2p+1}{2}$$

line pulses have appeared, wherein $k$ and $p$ are integers, $$\frac{2k+1}{2}$$

is the number of lines of a normal field and $$\frac{2k+1}{2}$$

must be divisible by $$\frac{2p+1}{2}$$

and in that the pulse supplied by the second counting circuit synchronizes a field pulse generator which operates with the frequency associated with the normal television signal and which produces the vertical deflection signal in the camera apparatus.

5. An apparatus as claimed in claim 3, wherein the camera apparatus comprises a generator for producing a deflection signal for the vertical scan, one period of which corresponding with the duration of $m$ fields of the normal television signal, and a starting switch coupled to said generator said generator being started by the first field synchronizing pulse, when said starting switch has been depressed.

6. An apparatus as claimed in claim 4, further comprising a second switch having three contacts, the second input of the second counting circuit is connected to the common contact of said switch the first of the remaining contacts is connected to the source of the normal field synchronizing pulses, and the second of the remaining contacts is connected to the output terminal of the second counting circuit, the rest position of said switch being that in which field synchronizing pulses are applied to the second input of the counting circuit.

7. An apparatus as claimed in claim 6, further comprising a bistable multivibrator having two inputs and an output, a relay means, coincidence stage, and a pressure switch provided for starting the apparatus, which switch is connected to said first input terminal of said bistable multivibrator, the output terminal of said multivibrator is connected to said relay means for moving the switch connected to the second counting circuit out of the rest position, when energized, the second input terminal of the bistable multivibrator is connected to an output terminal of a coincidence stage, the first input of said coincidence stage is coupled to the normal field synchronzing pulse and the second input of which is connected to the output of the second counting circuit, said apparatus being arranged so that, when the push-button is depressed, the multivibrator is caused to change over, so that the relay is energized after $$m=\frac{\frac{2k+1}{2}}{\frac{2p+1}{2}}$$

fields from the start, when the normal synchronizing pulse and the output pulse of the second counting circuit coincide, the coincidence stage provides an output signal which causes the bistable multivibrator to change back, so that the relay is de-energized.

8. An apparatus as claimed in claim 1, wherein the means for releasing the display apparatus for at least $n$ line periods or parts of line periods comprises a first counting circuit having applied the normal line synchronizing pulses derived from the incoming television signal and which is actuated each time by the field synchronizing pulse derived from the incoming television signal, after having been actuated, said counting circuit supplies a substantially square-wave pulse having a duration of at least $n$ line periods

9. An apparatus as claimed in claim 8, further comprising a field pulse generator and a second counting circuit, to a first input of which are applied the normal line synchronizing pulses derived from the incoming television signal and which is reset each time to the zero position by pulses applied to a second input and which, counting from the zero position, supplies a pulse when $$\frac{2k+1}{2}\pm\frac{2p+1}{2}$$

line pulses have appeared, wherein $k$ and $p$ are integers, $$\frac{2k+1}{2}$$

is the number of lines of a normal field and $$\frac{2k+1}{2}$$

must be divisible by $$\frac{2p+1}{2}$$

and in that the pulse supplied by the second counting circuit synchronizes said field pulse generator, which operates on the frequency associated with the normal television signal and which produces the vertical deflection signal in the display apparatus.

10. An apparatus as claimed in claim 8 wherein the display apparatus comprises a switch and a generator for producing a deflection signal for the vertical scan, one period of which corresponds with the duration of $m$ fields of the normal television signal, said generator being started by the first field synchronizing signal, after said switch has been closed by means of a code signal received from the transmitter.

11. an apparatus as claimed in claim 9, further comprising a switch having three contacts, the second input of the second counting circuit is connected to the common contact of said switch to the first of said remaining contacts is applied the field synchronizing pulse derived from the incoming television signal and the second of said remaining contacts is connected to the output terminal of the second counting circuit, the rest position of said switch is that in which the field synchronizing pulses are applied to the second input of the counting circuit.

12. An apparatus as claimed in claim 1 further comprising a decoding device wherein the incoming video signal is applied to said decoding device which supplies a signal only when the code signal transmitted is intended for the receiver concerned, said signal starting the receiving apparatus.

13. A receiving apparatus as claimed in claim 12, further comprising first and second coincidence stages, a bistable multivibrator, and a relay wherein the signals supplied by the decoding device are applied to the first input of said first coincidence stage, the second input of said first coincidence stage having applied the pulse obtained from the first counting circuit, the output of said stage being connected to the first input of said bistable multivibrator, the output of said multivibrator being connected to said relay which is capable of moving, when energized, at least the switch connected to the second counting circuit out of the rest position and of actuating a memory element, the second input of the bistable multivibrator is connected to the output of a second coincidence stage, the first input of said coincidence stage having applied the field synchronizing pulse derived from the incoming television signal, and the second input of said coincidence stage connected to the output of the second counting circuit, said receiving apparatus being arranged so that the first coincidence stage supplies a starting pulse in the presence of both the signal from the decoding device and the signal from the first counting circuit, said starting pulses causing the bistable multivibrator to change over, so that the relay is energized after the start and after $m$ fields, when the field synchronizing pulse and the output pulse of the second counting circuit coincide, the second coincidence stage supplies an output signal which causes the bistable multivibrator to change back, so that the relay is deenergized.

14. A receiving apparatus as claimed in claim 13, further comprising another relay contact connected to an alarm system.

15. A receiving apparatus as claimed in claim 13, wherein the memory element comprising a photographic camera, the shutter of which is controlled by the relay.

References Cited

UNITED STATES PATENTS

| | | | |
|---|---|---|---|
| 3,017,457 | 1/1962 | Johnson | 178—6 |
| 2,904,628 | 9/1959 | Haantjes et al. | 178—6 |

ROBERT L. GRIFFIN, Primary Examiner

BARRY L. LEIBOWITZ, Assistant Examiner

U.S. Cl. X.R.

178—6